A. E. SCHMIDT.
CHANGE GEAR MECHANISM.
APPLICATION FILED FEB. 14, 1910.
995,915.
Patented June 20, 1911.
2 SHEETS—SHEET 1.
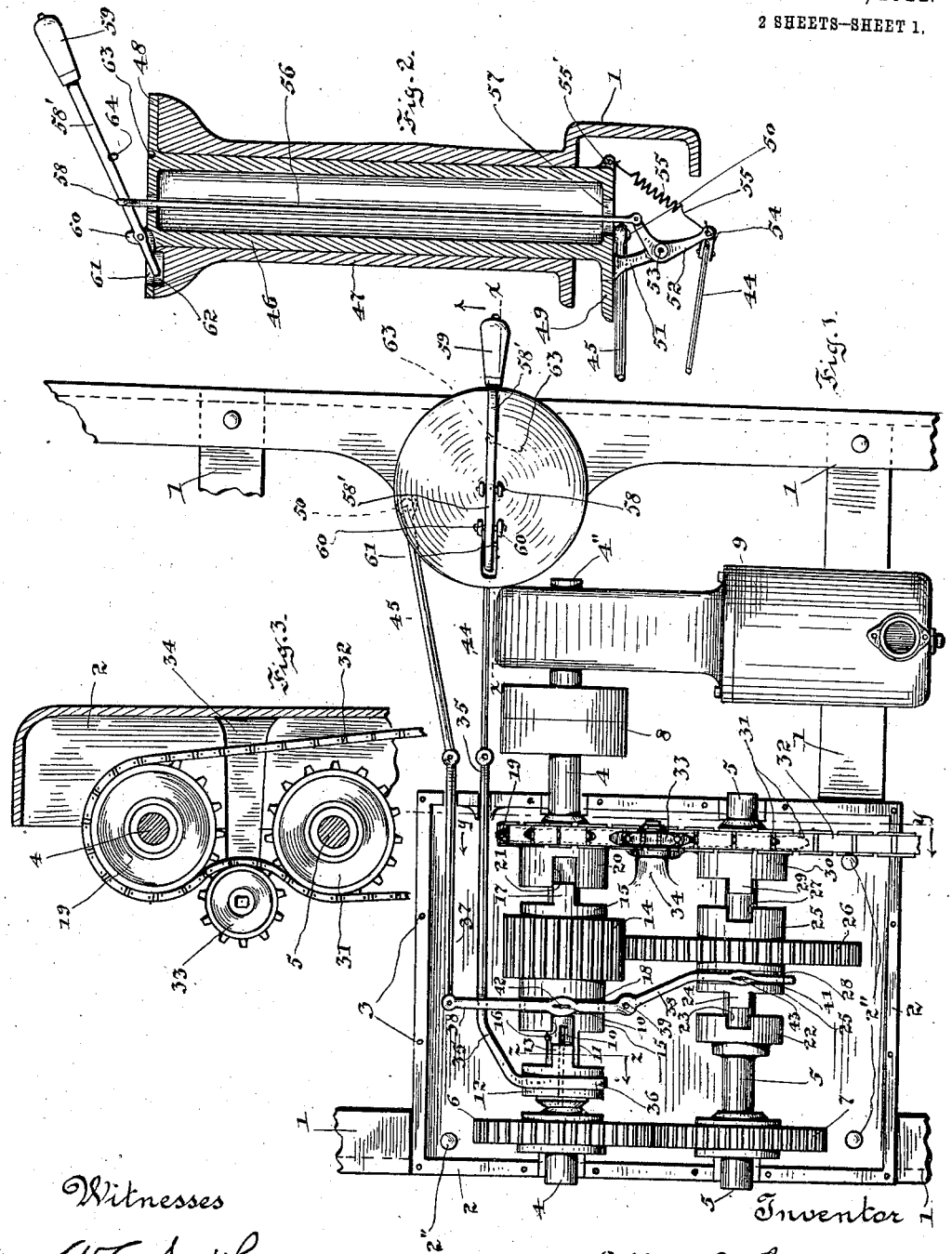

A. E. SCHMIDT.
CHANGE GEAR MECHANISM.
APPLICATION FILED FEB. 14, 1910.
995,915.
Patented June 20, 1911.
2 SHEETS—SHEET 2.
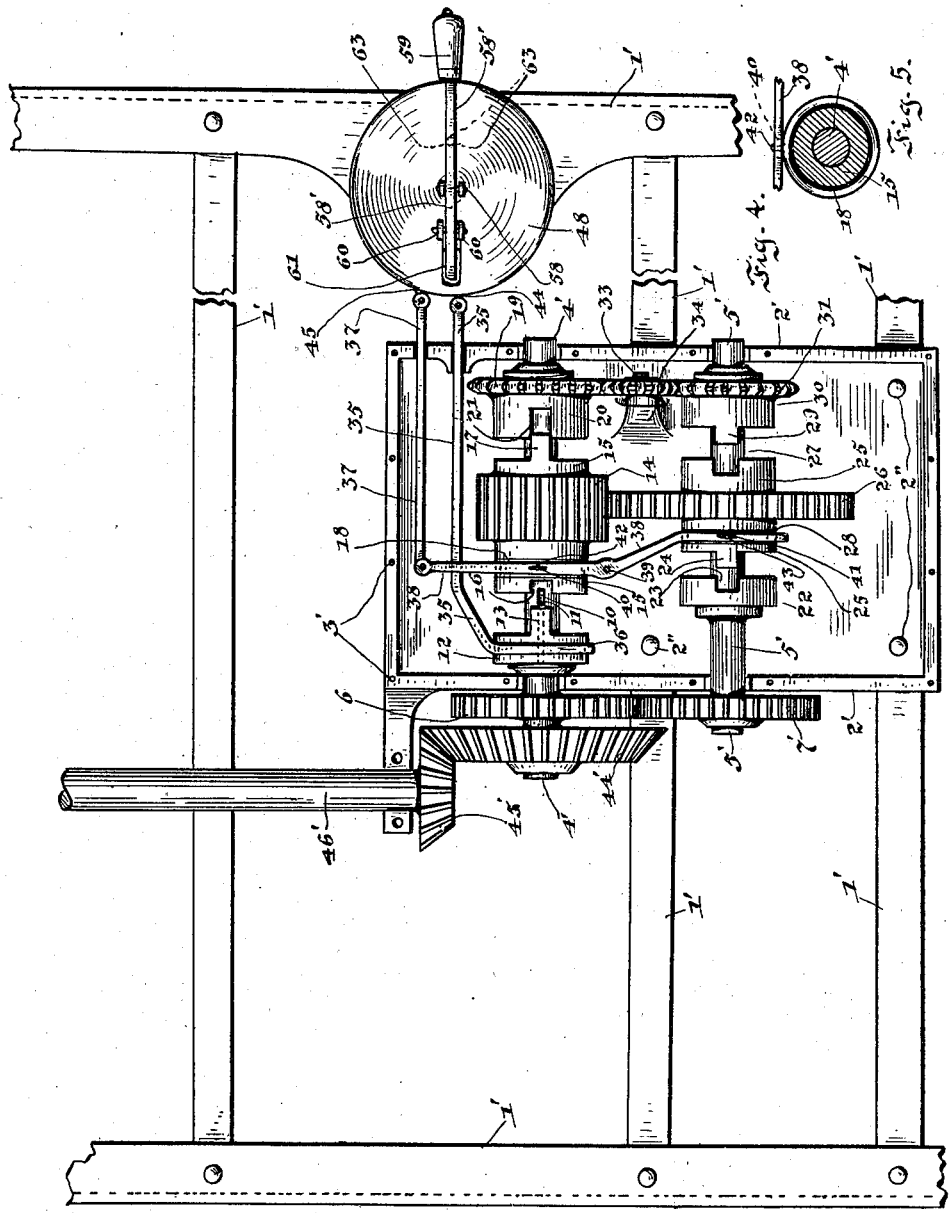

UNITED STATES PATENT OFFICE.

ALLEN EUGENE SCHMIDT, OF ELIZABETH, ILLINOIS.

CHANGE-GEAR MECHANISM.

995,915. Specification of Letters Patent. Patented June 20, 1911.

Application filed February 14, 1910. Serial No. 543,793.

*To all whom it may concern:*

Be it known that I, ALLEN E. SCHMIDT, a citizen of the United States, residing at Elizabeth, county of Jo Daviess, and State of Illinois, have invented certain new and useful Improvements in Change-Gear Mechanism, of which the following is a specification.

My invention relates to improvements in change-gear mechanism especially adapted for use in the transmission of power in an automobile with changes of speed and direction.

The object of the invention is to provide a change-gear mechanism of the nature stated which shall be of improved construction and operation.

The invention consists in the combination and arrangement of parts hereinafter described and claimed.

The invention will be more readily understood by reference to the accompanying drawings forming a part of this specification, and in which, Figure 1 is a plan view of the change-gear mechanism with the cover of the gear case removed, Fig. 2 is a section on line $x—x$ of Fig. 1 illustrating the operating lever and connections in a different position from that shown in Fig. 1, Fig. 3 is a partial section on line $y—y$ of Fig. 1, Fig. 4 is a top plan view of a modified form of application of the mechanism, Fig. 5 is a detail section illustrating the lever connection with one of the transmitting gears, and Fig. 6 is a section on line $z—z$ of Fig. 1.

The preferred form of construction as illustrated in Figs. 1, 2, 3, 5 and 6 comprises a suitable supporting frame 1 upon which is mounted a suitable gear case 2 secured thereon by rivets 2″. Screw holes 3 are provided in the lower half of gear casing 2 for convenience in securing a cover thereon. A drive shaft 4 and a lay shaft 5 are rotatably mounted in casing 2 and permanently geared together by means of gears 6 and 7 of equal sizes and fixed to their respective shafts. Shaft 4 is connected by means of clutch member 8 with engine shaft 4″ adapted to be driven by engine 9 in the usual manner. Drive shaft 4 is provided with a longitudinal groove 10 in which a key or feather 11 carried by the clutch member 12 slides, thus effecting a splined connection between said clutch member and said shaft. Clutch member 12 is provided with a projecting clutch member lug 13 and a gear 14 carried by a hub 15 loosely mounted upon shaft 4 is provided with a notch 16 adapted to receive lug 13 to effect a clutch connection therewith. On its other side hub 15 is provided with a clutch member projection 17 for a purpose to be hereinafter described. Hub 15 also carries a collar 18 loosely mounted in an annular groove and for a purpose to be hereinafter described. A sprocket wheel 19 is rotatably mounted on shaft 4 and carries a hub 20 provided with a clutch member notch 21 adapted to receive projection 17 to effect a clutch connection between said sprocket wheel and gear 14. Lay shaft 5 carries a clutch member 22 fixed thereon and provided with a clutch member notch 23 adapted to receive a clutch member projection 24 carried by the hub 25 which is loosely mounted upon shaft 5 and carries a gear 26 meshing with gear 14. It will be observed that gear 14 is made elongated so as to permit of lateral shifting of gears 14 and 26 relatively to each other while they remain constantly in mesh. At its other side hub 25 is provided with a clutch member notch 27 for a purpose to be hereinafter described, and said hub also carries a collar 28 loosely mounted in a groove therein and similar to collar 18 on hub 15. A clutch member projection 29 carried by hub 30 loosely mounted on the shaft 5 is adapted to receive the clutch member notch 27 on hub 25 to effect an operative connection between said hubs. Hub 30 carries a sprocket wheel 31 rotatably mounted on shaft 5 co-planar with sprocket wheel 19 on shaft 4. A sprocket chain 32 passes over sprocket wheel 19 and meshes with sprocket wheel 31 so as to cause rotation of said sprocket wheels in the same directions. Thence sprocket chain 32 passes rearwardly and it is designed to be connected with the axle or driven shaft of an automobile, as will be readily understood by those skilled in the art. An idler sprocket wheel 33 rotatably mounted on a standard 34 in case 2 serves to hold sprocket chain 32 in engagement with sprocket 31.

Clutch member 12 is operated by means of a slidable rod 35 passing through the wall of casing 2 and provided with a yoke 36 engaging an annular groove in said clutch member, as indicated in Fig. 6. Another slidable rod 37 is pivoted at its inner end to a lever 38 fulcrumed in the gear case at 39 and provided with slots 40 and 41 adapted to receive pins 42 and 43 carried by collars 18 and 28 respectively. By this arrangement it will be observed that upon reciprocation of rod 37 gears 14 and 26 will be caused to shift laterally with respect to each other in opposite directions. Rods 35 and 37 are operated through the medium of links 44 and 45 respectively.

For the operation of rods 35 and 37 I provide a tube 46 rotatably mounted in a pedestal 47 carried by frame 1 and located so as to be of convenient access to the driver or operator. At its upper end tube 46 carries a flange 48 adapted to engage the upper end of said pedestal to support said tube and at its lower end carries a flange 49 connected by means of a pivot 50 with link 45. Flange 49 also carries a hanger 51 to which a bell crank lever 52 is fulcrumed at 53. Bell crank lever 52 is connected by means of the universal joint 54 with link 44. A spring 55 connected with bell crank 52 and with a lug 55' on tube 46 serves to hold the parts normally in the position shown in Fig. 2. Bell crank 52 is connected by means of a link 56 passing through an opening 57 in the bottom of tube 46 with a lever 58' at 58. Lever 58' is provided with an operative handle 59 and is pivoted between lugs 60 projecting from the upper face of flange 48. Flange 48 and pedestal 47 are provided with notches 61 and 62 adapted to register when the parts are in the position indicated in Figs. 1 and 2, in which position said notches are adapted to receive the end of lever 58' which thus serves to lock the tube 46 against rotation in pedestal 47. Flange 48 is provided with a notch 63 adapted to receive a projection 64 on the under side of lever 58' when said lever is depressed, thus serving to strengthen the connection between said lever and said tube for turning the latter.

In operation the arrangement is such that spring 55 normally holds the lever 58' in elevated position, as indicated in Fig. 2, in which position the clutch member 12 is drawn into engagement with gear 14 and gear 14 forced over to engagement with sprocket wheel 19. This serves to effect a connection between the drive shaft and the driven shaft of the automobile causing the latter to be driven forwardly at the low speed. To change to the high speed lever 58' is depressed to throw clutch member 12 out of connection with gear 14 and then tube 46 is rotated by means of said lever to cause gear 26 to be connected with clutch member 22 and gear 14 with sprocket 19, thus causing the transmission of power to take place through gears 6 and 7 and 26 and 14 to sprocket wheel 19, increasing the speed of the latter and consequently that of the car. To reverse tube 46 is rotated in the reverse direction to that above described whereupon gear 14 is drawn into engagement with clutch member 12 and gear 26 with sprocket wheel 31, thus causing the transmission of power to take place through gears 14 and 26 to sprocket wheel 31, thus reversing the direction of travel of sprocket chain 32 and of the car and backing the car at a slow speed.

In Fig. 4 I have illustrated a modified form of construction in which the frame 1' and gear case 2' have slightly different forms and screw holes 3' have slightly different locations. Drive and lay shafts 4' and 5' are somewhat shorter and carry constantly meshing gears 6' and 7' located outside of gear case 2'. Lay shaft 4' is connected by means of a bevel gear 44' with a bevel gear 45' carried by engine shaft 46'. Otherwise this modified form of construction is identical with that above described, the changes therein being made for the purpose of adapting the mechanism to use with a vertically disposed engine driving a longitudinally disposed engine shaft.

While I have illustrated and described the preferred form of construction for carrying my invention into effect this is capable of variation and modification without departing from the spirit of my invention. I therefore do not wish to be limited to the exact details of construction set forth but desire to avail myself of such variations and modifications as come within the scope of the appended claims.

Having described my invention what I claim as new and desire to secure by Letters Patent is:

1. The combination with a drive shaft, of a lay shaft; constantly meshing gears fixed to said drive and lay shafts; constantly meshing gears loose on said drive and lay shafts; sprocket wheels rotatably mounted on said drive and lay shafts; a sprocket chain engaging said sprocket wheels and adapted to be connected to drive a driven shaft; means for connecting the drive shaft to the sprocket wheel thereon, simultaneously connecting the loose gear on the drive shaft with the sprocket wheel thereon and the loose gear on the lay shaft with said lay shaft, or simultaneously connecting the loose gear on the drive shaft with said drive shaft and the loose gear on the lay shaft with the sprocket wheel on said lay shaft, substantially as described.

2. In a mechanism the combination with a drive shaft, of a lay shaft; constantly meshing gears fixed to said drive and lay shafts; constantly meshing gears loose on said drive and lay shafts; sprocket wheels rotatably mounted on said drive and lay shafts; a sprocket chain engaging said sprocket wheels and adapted to be connected to drive a driven shaft; an idler sprocket wheel arranged to hold said chain in engagement with said wheels and means for connecting the drive shaft to the sprocket wheel thereon, simultaneously connecting the loose gear on the drive shaft with the sprocket wheel thereon and the loose gear on the lay shaft with said lay shaft, or simultaneously connecting the loose gear on the drive shaft with said drive shaft and the loose gear on the lay shaft with the sprocket wheel on said lay shaft, substantially as described.

3. In a mechanism the combination with a drive shaft, of a lay shaft; constantly meshing gears connected to said drive shaft and lay shaft; constantly meshing gears on said drive and lay shafts; sprocket wheels rotatably mounted on said drive and lay shafts; a sprocket chain engaging said sprocket wheels and adapted to be connected to drive a driven shaft; an idler sprocket wheel arranged to hold said chain in engagement with said wheels; and means for connecting the drive shaft to the sprocket wheel thereon and the loose gear and sprocket wheel on said drive shaft with said drive shaft, simultaneously connecting the loose gear on the drive shaft with the sprocket wheel thereon and the loose gear on the lay shaft with said lay shaft, or simultaneously connecting the loose gear on the drive shaft with said drive shaft and the loose gear on the lay shaft with the sprocket wheel on said lay shaft, substantially as described.

4. In a mechanism the combination with a drive shaft; a lay shaft; constantly meshing gears fixed to said drive and lay shafts; constantly meshing gears slidable on said drive and lay shafts, one of said gears being elongated to permit lateral shifting of the other relatively thereto; a clutch member splined to said drive shaft on one side of the slidable gear thereon and adapted to engage said slidable gear; a sprocket wheel loosely mounted on said drive shaft on the other side of the slidable gear; a clutch connection between said sprocket wheel and its adjoining slidable gear; means for shifting said clutch member to engage said slidable gear and cause the latter to engage said sprocket wheel; a sprocket wheel loosely mounted on said lay shaft coplanar with said first mentioned sprocket wheel; a sprocket chain engaging said sprocket wheels and adapted to be connected to drive an automobile; clutch mechanism for connecting the sprocket wheel and slidable gear on the lay shaft; a clutch member fixed to said lay shaft on the opposite side of its slidable gear and adapted to be engaged by said gear; and means for simultaneously shifting said slidable gears in opposite directions, substantially as described.

5. In a mechanism the combination with a drive shaft; a lay shaft; constantly meshing gears fixed to said drive and lay shafts; constantly meshing gears slidable on said drive and lay shafts, one of said gears being elongated to permit lateral shifting of the other relatively thereto; a clutch member splined to said drive shaft on one side of the slidable gear thereon and adapted to engage said slidable gear; a sprocket wheel loosely mounted on said drive shaft on the other side of the slidable gear; a clutch connection between said sprocket wheel and its adjoining slidable gear; means for shifting said clutch to engage said slidable gear and cause the latter to engage said sprocket wheel; a sprocket wheel loosely mounted on said lay shaft coplanar with said first mentioned sprocket wheel; a sprocket chain engaging said sprocket wheels and adapted to be connected to drive an automobile; an idler sprocket wheel arranged to hold said chain in engagement with said wheels; clutch mechanism for connecting the sprocket wheel and slidable gear on the lay shaft; a clutch member fixed to said lay shaft on the opposite side of its slidable gear and adapted to clutch said gear; and means for simultaneously shifting said slidable gears in opposite directions, substantially as described.

6. In a mechanism the combination with a drive shaft of a lay shaft; constantly meshing gears fixed to said drive and lay shafts; a clutch member splined on said drive shaft; a clutch member rotatably mounted on said drive shaft; a double clutch member loosely mounted on said drive shaft between said clutch members and adapted to engage either; a sprocket wheel on said rotatably mounted clutch member; a gear on said double clutch member; a double clutch member loosely mounted on said lay shaft and carrying a gear in constant mesh with the gear on said aforementioned double clutch member; a clutch member rotatably mounted on said lay shaft; a sprocket wheel on said last mentioned clutch member co-planar with said first mentioned sprocket wheel; a clutch member fixed to said lay shaft on the side of the double clutch member opposite to the rotatably mounted clutch member; a sprocket chain running over said sprocket wheels; means for shifting said splined clutch member on said drive shaft; and means for simultaneously shifting said double clutch members in opposite directions on their respective shafts, substantially as described.

7. In a mechanism the combination with a drive shaft of a lay shaft; constantly meshing gears fixed to said drive and lay shafts; a clutch member splined on said drive shaft; a clutch member rotatably mounted on said drive shaft; a double clutch member loosely mounted on said drive shaft between said clutch members and adapted to engage either; a sprocket wheel on said rotatably mounted clutch member; a gear on said double clutch member; a double clutch member loosely mounted on said lay shaft and carrying a gear in constant mesh with the gear on said aforementioned double clutch member; a clutch rotatably mounted on said lay shaft and carrying a sprocket wheel co-planar with said first mentioned sprocket wheel; a clutch member fixed to said lay shaft on the side of the double clutch member opposite to the rotatably mounted clutch member; a sprocket chain running over said sprocket wheels; means for shifting said splined clutch member on said drive shaft; a lever connected with both of said double clutch members and fulcrumed between them; and means for operating said lever, substantially as described.

In testimony whereof I have signed my name to this specification in the presence of two subscribing witnesses.

ALLEN EUGENE SCHMIDT.

Witnesses:
E. L. LEONARD,
R. E. HAIG.

Copies of this patent may be obtained for five cents each, by addressing the "Commissioner of Patents, Washington, D. C."